United States Patent
Pakhomov et al.

(10) Patent No.: US 7,016,262 B2
(45) Date of Patent: Mar. 21, 2006

(54) SEISMIC SENSOR

(75) Inventors: Alexander Pakhomov, Yonkers, NY (US); Tim Goldburt, Chappaqua, NY (US)

(73) Assignee: General Phosphorix, LLC, Ardsley, NY (US)

( * ) Notice: Subject to any disclaimer, the term of this patent is extended or adjusted under 35 U.S.C. 154(b) by 114 days.

(21) Appl. No.: 10/659,355

(22) Filed: Sep. 11, 2003

(65) Prior Publication Data

US 2005/0058025 A1 Mar. 17, 2005

(51) Int. Cl.
*H04R 19/00* (2006.01)
*G01V 1/16* (2006.01)

(52) U.S. Cl. ............... 367/181; 367/178; 181/112; 181/122; 73/649

(58) Field of Classification Search ............ 367/174, 367/178, 181, 163, 160, 162, 165, 170, 176; 181/112, 122; 73/649; 381/174, 191
See application file for complete search history.

(56) References Cited

U.S. PATENT DOCUMENTS

| | | | | |
|---|---|---|---|---|
| 4,041,466 A | * | 8/1977 | Stuart | 318/574 |
| 4,329,547 A | * | 5/1982 | Imai | 381/163 |
| 5,097,515 A | * | 3/1992 | Baba | 381/191 |
| 5,142,142 A | * | 8/1992 | Senechalle et al. | 250/227.23 |
| 5,209,117 A | * | 5/1993 | Bennett | 73/514.16 |
| 5,255,246 A | * | 10/1993 | van Halteren | 367/170 |
| 5,335,286 A | * | 8/1994 | Carlson et al. | 381/191 |
| 5,536,342 A | * | 7/1996 | Reis et al. | 156/64 |
| 5,570,428 A | * | 10/1996 | Madaffari et al. | 381/191 |
| 6,169,810 B1 | * | 1/2001 | van Halteren et al. | 381/174 |
| 6,178,249 B1 | * | 1/2001 | Hietanen et al. | 381/174 |
| 6,298,730 B1 | * | 10/2001 | Yamagishi et al. | 73/723 |
| 6,694,032 B1 | * | 2/2004 | Yun et al. | 381/174 |

* cited by examiner

*Primary Examiner*—Ian J. Lobo
(74) *Attorney, Agent, or Firm*—I. Zborovsky

(57) ABSTRACT

A seismic sensor, comprising a case, a pre-charged, non-conductive membrane located between two plates that form a capacitor and accommodated inside the case, with one of the plates being immovable relative to the case and the other of the plates being movable relative to the one plate under the action of seismic activity so that the capacitor produces an electrical signal responsive to the seismic activity of a medium in which the sensor is located, and a mass increasing element associated with the movable plate so as to increase mass of the movable plate and therefore to enhance oscillations of the movable plate under the action of the seismic activity, the mass increasing element being formed as a further case which is connected to the movable plate and is located in condition of equilibrium in an inoperative position of the sensor.

9 Claims, 1 Drawing Sheet

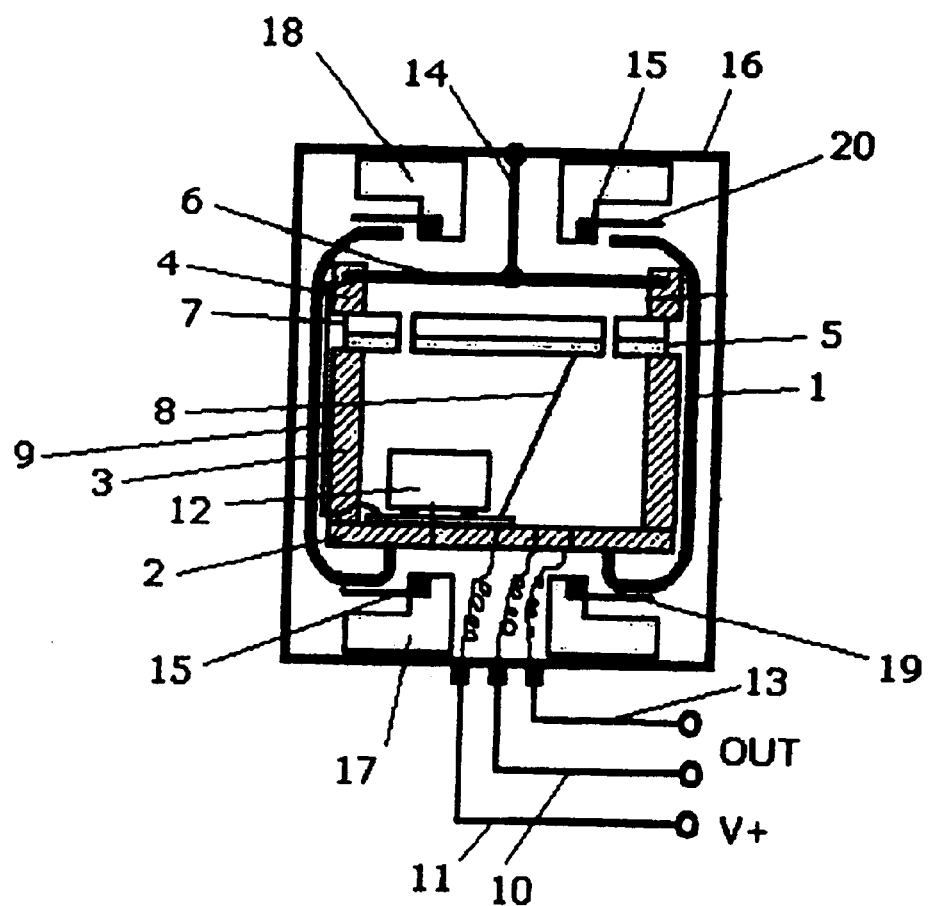

US 7,016,262 B2

SEISMIC SENSOR

BACKGROUND OF THE INVENTION

The present invention relates generally to seismic sensors.

More particularly, it relates to electromagnetic seismic sensors. Electromagnetic seismic sensors are known in the art. One of the known electromagnetic seismic sensors includes a core with a winding which is movable in an electromagnetic field under the action of seismic activity, so that a corresponding electrical signal is produced and detected, which is indicative of the seismic activity. One of such sensors is disclosed in our patent application Ser. No. 10/659,298 filed Sep. 11, 2003. It is believed that the existing seismic sensors of the above mentioned general type can be further improved.

SUMMARY OF THE INVENTION

Accordingly, it is an object of the present invention to provide a seismic sensor which is a further improvement of the existing seismic sensors.

In keeping with these objects and with others which will become apparent hereinafter, one feature of the present invention resides, briefly stated, in a seismic sensor which has a pre-charged, non-conductive membrane which is located between two plates that form a capacitor, wherein one of the plates is fixed, while the other plate moves under the action of seismic activity, and an additional element which increases mass of the movable plate is provided, said mass increasing element being formed so that in an inoperative position is suspended in condition of equilibrium and not subjected to loads.

When the seismic sensor is designed in accordance with the present invention, not only it increases the mass of the movable plate and therefore enhances its oscillations relative to the movable plate, but also it is held in condition of equilibrium so that it is not subjected to any stresses, and starts oscillating only under the action of the seismic activity, thereby providing higher sensitivity of the sensor and accuracy of measurements.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing a cross-section of a seismic sensor in accordance with the present invention.

DESCRIPTION OF THE PREFERRED EMBODIMENTS

A seismic sensor in accordance with the present invention has a case which is identified with reference numeral 1. A lower support including a bottom plate 2 and a lower bush 3, and an upper support formed as an upper bush 4 are located in the case and immovably connected with the case, for example by glueing, welding, etc.

The sensor further has two plates 5 and 6 which together form a capacitor. The plate 5 is immovable relative to the support and therefore relative to the case of the sensor, while plate 6 is movable relative to the plate 5. For example, the plate 6 is formed as a flexible diaphragm. A pre-charged, nonconductive membrane is located between the plates 5 and 6. It can be composed, for example, of electret.

The plates 5 and 6 of the capacitor are electrically connected with the electronic unit 12 by conductors 8 and 9. The electronic unit 12 is connected with an electrical power supply through conductors 10 and 11.

The electronic unit 12 can include an operational amplifier with high impedance input and any resistance and capacitance. The amplifier also place the role of an active filter. For protection from the electromagnetic interference the case 1 of the sensor can be formed as a double shield, with one shield composed of copper and the other shield composed of nickel. The double shield is needed in the case when the electromagnetic interference is very high. In other cases it is sufficient to use a single shield. The electromagnetic unit provides signal buffering, filtering, self-biasing, and external fandom biasing.

The seismic sensor is further provided with an element 14 for increasing the mass of the movable plate 6. The element 14 increases the mass of the movable plate 6 and therefore enhances its oscillations relative to the immovable plate 5 under the action of seismic activity. The mass increasing element 14 includes a rod 15 which is connected with the movable plate 6, and an outer shield 16 which is connected with the opposite end of the rod 15. Two annular bushings 17 and 18 are located outside of the case 1 and immovably connected With the shield 16. The bushings 17 and 18 carry disc shaped springs 19 and 20 adapted to cooperate with lower and upper substantially horizontal portions of the case 1.

In the position shown in the drawings, the springs 19 and 20 support the shield 16 in a position of equilibrium, so that no force is applied to the movable plate 6 through the rod 15. When however seismic activity occurs in the medium which the seismic sensor is accommodated, the movable plate 6 loaded with the shield 16 oscillates relative to the immovable plate 5, overcoming the action of the springs 19 and 20.

The electrical signals produced by the capacitor 5, 6 are received in the electronic unit 12 which processes the signals and outputs an output signal indicative of the seismic activity detected by the seismic sensor. The output signal can be analyzed, evaluated, interpreted, etc. in corresponding devices.

It will be understood that each of the elements described above, or two or more together, may also find a useful application in other types of constructions differing from the types described above.

While the invention has been illustrated and described as embodied in seismic sensor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A seismic sensor, comprising a case; a pre-charged, non-conductive membrane located between two plates that form a capacitor and accommodated inside said case, with one of said plates being immovable relative to said case and the other of said plates being movable relative to said one plate under the action of seismic activity so that said capacitor produces an electrical signal responsive to the seismic activity of a medium in which the sensor is located; and a mass increasing element associated with said movable plate so as to increase mass of said movable plate and therefore to enhance oscillations of said movable plate under the action of the seismic activity, said mass increasing element being formed as a further case which surrounds said plates, is connected to said movable plate and is located in condition of equilibrium in an inoperative position of the sensor.

2. A seismic sensor as defined in claim 1, wherein said further case is located outside said first mentioned case.

3. A seismic sensor as defined in claim 1; and further comprising means for maintaining said further case in condition of equilibrium and including spring means.

4. A seismic sensor as defined in claim 3, wherein said spring means include two springs located above and below said first mentioned case and held in support means immovably connected with said further case.

5. A seismic sensor as defined in claim 1; and further comprising an electronic unit which is connected with said capacitor.

6. A seismic sensor as defined in claim 5, wherein said electronic unit including an operational amplifier with high impedance input and a resistance, and a capacitance.

7. A seismic sensor as defined in claim 1, wherein said case is formed as a double shield for protection from electromagnetic interference.

8. A seismic sensor as defined in claim 7, wherein said double shield includes one shield composed of copper and another shield composed of nickel.

9. A seismic sensor as defined in claim 1; and further comprising a thin, elongated connecting element which connects said further case to said movable plate and is located in a center of said movable plate and said further case.

* * * * *